Feb. 4, 1941. A. POZZI 2,230,761
HYDRATING LIME
Filed March 7, 1939
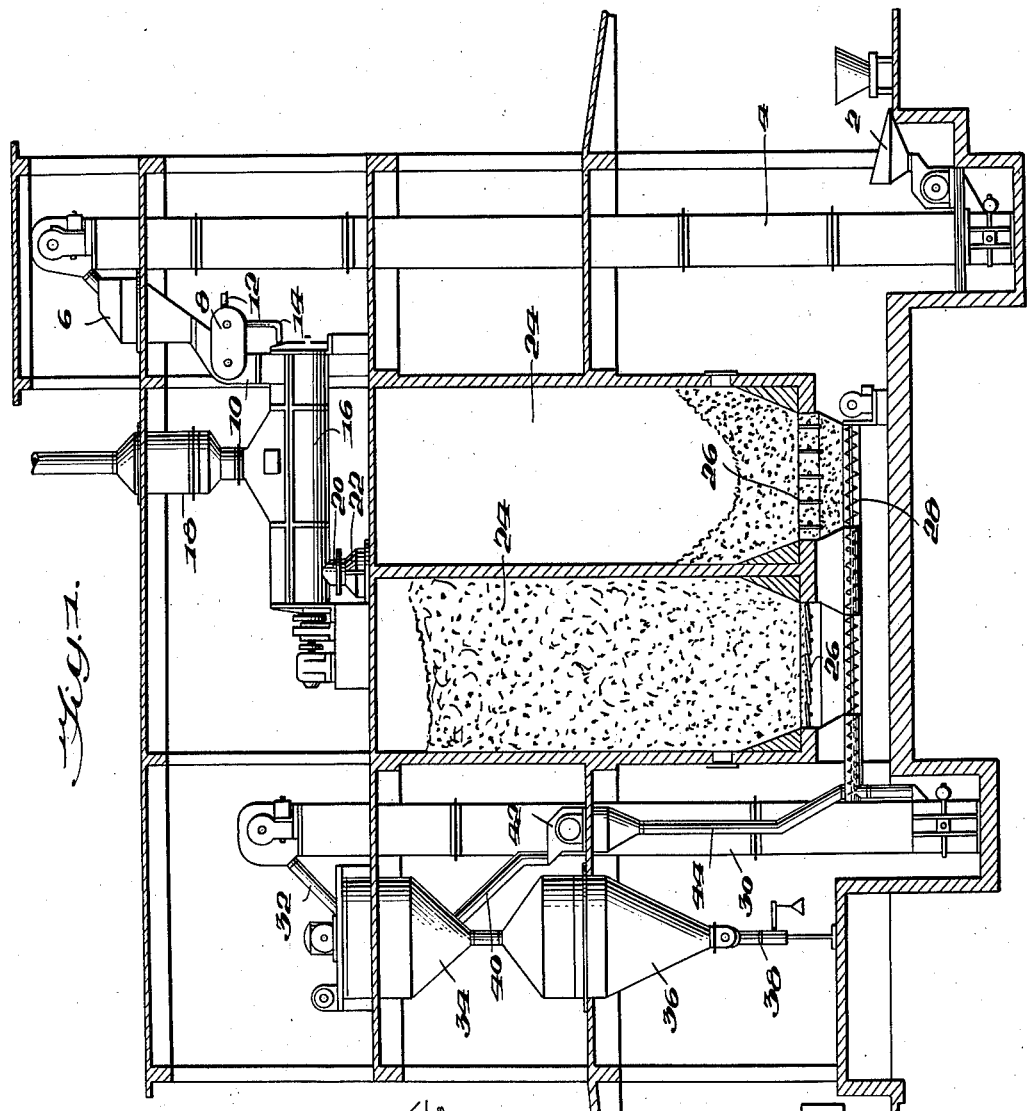
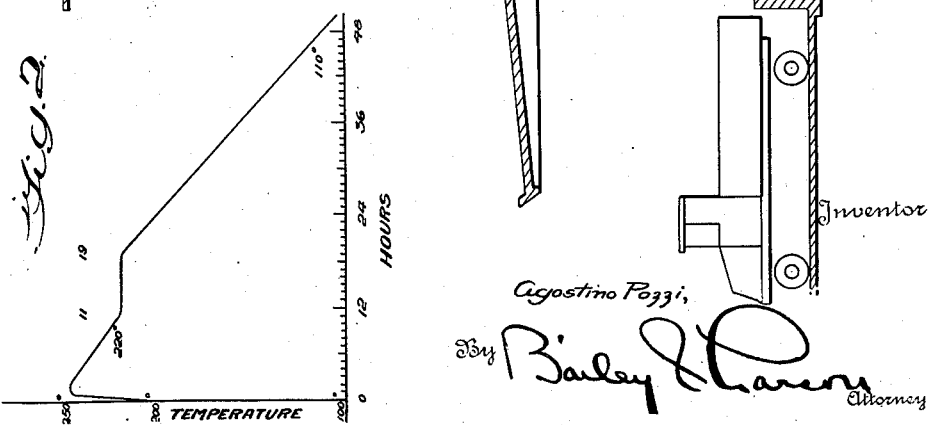
Inventor
Agostino Pozzi,
By Bailey
Attorney Patented Feb. 4, 1941

2,230,761

UNITED STATES PATENT OFFICE 2,230,761

HYDRATING LIME

Agostino Pozzi, Milan, Italy, assignor, by mesne assignments, to Adhesive Lime Limited, a corporation of Canada Application March 7, 1939, Serial No. 260,422
In Italy May 15, 1930

5 Claims. (Cl. 23—189)

This application is a continuation in part of my application Serial No. 534,451, filed May 1, 1931.

The invention relates to a process for producing a new form of hydrated lime, and to the new product so produced.

The object of the process is to produce a lime which is greatly superior to any lime heretofore known in its properties, and which may be used for purposes for which lime has heretofore been useless.

The primary object of the invention is to produce a lime which gradually hardens as time goes on and eventually petrifies. In other words, whereas ordinary lime or plaster containing the same can be reduced by water to a soft state, even after many years, lime produced according to the present process assumes a stone-like condition in which it cannot be converted with water to its original state.

A second object of the invention is to provide a lime which when used alone or in a plaster or mortar has greater strength in shear, in tension and in compression than any limes heretofore produced. Another object of the invention is to provide a lime which has high adhesive properties, and which will adhere strongly to glass, metal, concrete, or paperboard, to all of which ordinary lime is practically non-adherent.

A further object of the invention is to produce a lime which may be used in place of cement or plaster of Paris in the production of mortar, plasters, stucco and the like.

Another object of the invention is to provide a lime which is resistant to the action of water, so that plaster or mortar made therefrom will not deteriorate when subjected to moisture. Aside from the advantages of increased strength and durability under all conditions of use, this feature has the further advantage that efflorescence does not take place so that a wall utilizing mortar made from such lime remains clean and does not become discolored by the action of water.

A further object of the invention is to provide a lime which requires less water to form a putty of the normal specifications, so that a plaster made therefrom contains less water and when dried has fewer air voids. Such a lime when used in plaster or mortar does not crack through contraction, so that walls produced therefrom are more enduring than those in which ordinary lime or other materials are used.

Still another object of the invention is to produce a lime which is capable of taking lime-proof or mineral colors, without the fading or changing of such colors after the lime is applied. Even light blues and greens, which cannot be used in ordinary plaster, can be utilized with plaster made from lime produced according to the invention.

An additional object of the invention is to provide a lime which when used as a plaster or the like can be painted on within a day or so after its application, because the plaster will not burn the paint, and also quickly forms a hard skin on its surface even though it is slow in reaching a full set and its final hardness.

Another object of the invention is to produce a lime at a price comparable to that of ordinary hydrate of lime.

A further object of the invention is to provide for the utilization of all lime leaving the hydrating device, by grinding any coarse particles therein.

The process according to the present invention comprises generally the steps of mixing the lime thoroughly with water and a certain amount of hydrochloric acid in a commercial hydrator for substantially the usual period of time. The lime so treated is then introduced into a silo or container and left to stand therein without agitation. The silo is of such construction that heat which is developed therein does not readily escape. After the lime is introduced into the silo the temperature rises and soon reaches a maximum of about 250° F. Inasmuch as the silo is constructed to retain this heat, the lime is kept at a high heat in the silo. The temperature then drops fairly rapidly for about 30° F., remains substantially constant at about 220° F. for a considerable period of time, and then drops again to atmospheric. The total drop in temperature may take from one to three days. The lime is maintained in the silo until the drop in temperature has taken place, and is then after certain further treatment ready for use.

I am aware that lime has previously been slaked with hydrochloric acid. However, the use of even small quantities of hydrochloric acid, considerably below the minimum required for the practical operation of applicant's process, produces a lumpy lime which will not meet the specifications generally recognized, and which does not have the same qualities as lime produced according to the invention.

Further objects and advantages of the invention will appear more fully from the following description particularly when taken in conjunction with the accompanying drawing which forms a part thereof.

In the drawing:

Fig. 1 shows diagrammatically a plant which may be utilized for carrying out the process.

Fig. 2 is a chart of a typical temperature measurements in the silos.

Reference will first be made to the machinery shown in Fig. 1 for carrying out the process. Quick lime is introduced through hopper 2 into the bottom of an elevator 4 which raises it and discharges it into a hopper 6. A pump mechanism 8 simultaneously introduces lime from hopper 6 into pipe 10 and water from pipe 12 into pipe 14, this water containing the required amount of hydrochloric acid. The feed of water and lime is thus coordinated. The water and lime are fed by pipes 10 and 14 into the hydrator or mixer 16, which may be a commercial type of lime hydrator containing a conveying screw for thoroughly agitating the lime and water as they pass along the conveyor. The reaction in the agitator produces considerable heat which vaporizes a part of the water. 18 is a safety device which prevents most particles of lime from escaping with the steam which is so developed during the process, and also permits the escape of the steam if an excess pressure is created. The discharge 20 of the hydrator 16 opens into a valve mechanism 22 for selectively feeding the lime into any one of a plurality of silos or chambers 24.

The silos 24 are closed at the bottom by grate-like members 26, which may be opened to discharge the lime into a conveyor 28. This conveyor feeds the lime to an elevator 30, which discharges through pipe 32 into an air separator 34. The air separator permits the fines to drop into a final chamber 36, having a discharge hopper 38 in the bottom for bagging the lime. The coarse particles are returned from the air separator 34 through pipe 40 to a grinder 42, which grinds these particles and returns them through pipe 44 to the bottom of elevator 30. These ground particles are thus fed again to the air separator 34 and the fines therefrom will be discharged into hopper 36.

According to the invention a certain minimum amount of acid is necessary in order to obtain to any substantial extent the important advantages of the new material. In practice the amount of water used is dependent on the particular lime being treated, varying from about 23% to 70% of the weight of the lime. The amount of water is in any event sufficient to hydrate the lime completely but not enough to leave any excess which would make the lime leaving the hydrator quite damp and lumpy. The amount of water required is somewhat more than the theoretical amount, inasmuch as the heat of reaction within the hydrator causes the evaporation of a certain part of the water.

The acid is usually utilized in the form of a commercial solution of 20° Baumé, containing therefore approximately 32% of hydrochloric acid. In the preferred embodiment of the process there is used about 9% of 20° Baumé hydrochloric acid calculated on the amount of oxide in the lime. Some limes of course contain more inert materials than others, and obviously the particular quantity of acid will vary somewhat. In order to obtain the objects of the invention in a practical and economical manner, however, the amount of 20° Baumé acid should be kept within the range of 5% to 12% based on the oxides (including magnesium oxide) in the lime. Of course the water content of the 20° Baumé acid is included in calculating the amount of water required for hydration.

On the basis of pure hydrogen chloride, the amount to be used should be between substantially 1.6% and 3.85% on the oxides in the lime, the preferred amount being about 2.9%.

After the lime is introduced into the silos 24, having been mixed in the hydrator 16 with water containing the proper amount of acid, the temperature in these silos rises generally in accordance with the diagram shown in Fig. 2 of the drawing. From a temperature of about 210° F. upon entering the silo, it rapidly rises to about 250° F., showing that some chemical reaction is proceeding therein. This rise in temperature takes place in about one hour. The temperature then drops gradually for about ten hours until it reaches around 220° F. At this time the temperature curve levels off, indicating some secondary reaction, and for about eight hours the temperature remains substantially constant around 220° F. Thereafter the temperature drops down gradually, and in ordinary practice the lime is removed from the silos when it is cool enough to handle, that is, between 120° F. and 110° F. The total time required is from one to three days, generally about two days. The lime must, in any event, remain in the silo beyond the knee or flattened portion of the curve, that is, until the temperature drops below about 200° F. or 180° F.

I am not aware of the exact chemical nature of the changes which take place within the silos. However, the lime coming from the silos has all of the desirable properties set forth above, which are not present in other limes. The following comparisons between the lime produced according to the process and commercial hydrated limes will indicate the great advantages thereof:

| Property | Commercial hydrate | New product |
|---|---|---|
| Plasticity measured on Emley plasticimeter | Less than 200 | 500 to 600 |
| Water necessary to produce putty of normal consistency percent | 104 | 75 |
| Adhesion to brick—pounds per square inch at 28 days | 0 to 5 | 19.2 |
| Area of mortar break from adhesion tests at 28 days percent | 1 | 75 |
| Shear tests at 58 days pounds | 118 | 1610 |
| Compression tests at 36 days, pounds per square inch | 165 | 259 |
| Compression tests at 105 days, pounds per square inch | 219 | 325 |
| Tensile strength at 4 months, pounds per square inch | 18 | 65 |

In the production of mortar, with ordinary lime a mixture of one part of lime to five parts of sand is considered necessary to produce a mortar of adequate strength. The lime produced according to the present invention may be mixed in the ratio of one part by weight of lime to ten parts of sand, and produce a mortar which is still stronger than that produced with the 1 to 5 ratio with ordinary lime.

The mortar and plaster produced with lime according to the invention have an alveolar structure which is not present in mortar produced from ordinary lime hydrate.

An example of carrying out the process according to the invention is as follows: 400 pounds of quick lime (about 90% oxide) are introduced through the hydrator 16 into one of the silos 24 along with 160 pounds of water and 32½ pounds of hydrochloric acid of 20° Baumé. The passing of lime through the hydrator 16 requires about ten minutes. The silo is then closed and the lime is allowed to remain therein for forty-eight hours. The temperature in the silo proceeds substantially in accordance with Fig. 2. At the end of the time the lime is removed in a dry state, ground and bagged.

While for practical purposes the lime is transferred from the hydrator to the silo, so that the hydrator may be used for mixing other batches, such transfer from one vessel to another is not necessary. In fact, the lime, water and acid may be introduced into a suitable vessel which will retain the heat of the reaction, stirred by hand and then left to stand for the requisite period.

In some instances where a very pure, porous quicklime is used it may be desirable to add small amounts of sulfuric acid to retard the hydration reaction.

While I have described herein one embodiment of my invention I wish it to be understood that I do not intend to limit myself thereby except within the scope of the appended claims.

I claim:

1. A process of hydrating lime which comprises admixing lime with water in a quantity just sufficient to hydrate the lime and containing hydrogen chloride in an amount substantially of from 1.6% to 3.85% based on the oxides in the lime, maintaining said lime at rest in insulated storage under such conditions that the lime is subjected to the strong heat of reaction developed in the mass thereof until the temperature rises above and drops below 200° F.

2. A process of hydrating lime which comprises thoroughly admixing lime with water in a quantity just sufficient to hydrate the lime and containing hydrogen chloride in an amount substantially of from 1.6% to 3.85% based on the oxides in the lime, maintaining said lime at rest in insulated storage under such conditions that the lime is subjected to the strong heat of reaction developed in the mass thereof until the temperature rises, drops to an intermediate point, remains substantially constant for a considerable period of time and then drops again.

3. A process of hydrating lime which comprises thoroughly admixing lime with water in a quantity just sufficient to hydrate the lime and containing hydrogen chloride in an amount of substantially 2.9% based on the oxides in the lime, maintaining said lime at rest in insulated storage under such conditions that the lime is subjected to the strong heat of reaction developed in the mass thereof until the temperature rises, drops to an intermediate point, remains substantially constant for a considerable period of time and then drops again.

4. A process of hydrating lime which comprises thoroughly admixing lime with water in a quantity just sufficient to hydrate the lime and containing hydrogen chloride in an amount substantially of from 1.6% to 3.85% based on the oxides in the lime, maintaining said lime at rest in insulated storage under such conditions that the lime is subjected to the strong heat of reaction developed in the mass thereof for at least twenty-four hours.

5. A product identical with that produced according to the process claimed in claim 1.

AGOSTINO POZZI.